US007366089B2

(12) United States Patent
Tehrani et al.

(10) Patent No.: US 7,366,089 B2
(45) Date of Patent: Apr. 29, 2008

(54) APPARATUS AND METHOD OF MULTIPLE ANTENNA RECEIVER COMBINING OF HIGH DATA RATE WIDEBAND PACKETIZED WIRELESS COMMUNICATION SIGNALS

(75) Inventors: Ardavan M. Tehrani, Menlo Park, CA (US); Won-Joon Choi, Sunnyvale, CA (US); Jeffrey M. Gilbert, Sunnyvale, CA (US); Yi Hsiu Wang, Menlo Park, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 939 days.

(21) Appl. No.: 10/682,787

(22) Filed: Oct. 8, 2003

(65) Prior Publication Data

US 2005/0078649 A1    Apr. 14, 2005

(51) Int. Cl.
*H04L 5/04* (2006.01)
(52) U.S. Cl. .................. 370/208; 370/210; 375/347
(58) Field of Classification Search .............. 370/210, 370/208, 203, 480, 343; 375/347, 365, 345; 455/101, 138
See application file for complete search history.

(56) References Cited

U.S. PATENT DOCUMENTS

| | | | |
|---|---|---|---|
| 6,128,276 A | 10/2000 | Agee ........................ | 370/208 |
| 6,522,898 B1 | 2/2003 | Kohno et al. | |
| 6,563,858 B1 | 5/2003 | Fakatselis et al. | |
| 6,654,340 B1 * | 11/2003 | Jones et al. ................. | 370/208 |
| 2002/0172269 A1 | 11/2002 | Xu | |
| 2003/0002471 A1 * | 1/2003 | Crawford et al. ........... | 370/343 |

(Continued)

FOREIGN PATENT DOCUMENTS

| | | |
|---|---|---|
| EP | 9 622 911 A2 | 11/1994 |
| EP | 1 185 048 A2 | 3/2002 |
| EP | 1 220 505 A2 | 7/2002 |
| EP | 1 231 722 | 8/2002 |

(Continued)

OTHER PUBLICATIONS

Chen et al.; "Symbol timing and channel estimation of IEEE802.11a based on OFDM"; □□IEEE CCECE 2003. Canadian Conference on Electrical and Computer Engineering, 2003.; vol. 3, May 4-7, 2003 pp. 1547-1550 vol. 3.*

(Continued)

*Primary Examiner*—Ricky Q. Ngo
*Assistant Examiner*—Gary Mui
(74) *Attorney, Agent, or Firm*—Bever, Hoffman & Harms, LLP; Jeanette S. Harms

(57) ABSTRACT

The present invention provides an apparatus and method of multiple antenna receiver combining of high data rate wideband packetized wireless communication signals, where the apparatus includes M receive antennas, receiving M high data rate wideband packetized wireless communication signals, where each of the signals includes N frequency bins. The apparatus, in an exemplary embodiment, includes (1) a joint timing recovery units that perform joint coarse signal timing estimation, joint frequency offset estimation, and joint fine timing estimation on each of the signals, (2) M Fast Fourier Transform units (FFTs) that each convert the digital data for each of the M signals into frequency domain information for each of the N received frequencies and that output Q pilots for each of the signals, where Q is a positive integer, and (3) a combiner that weights and combines the outputs of the M FFTs for each of the N received frequencies.

36 Claims, 11 Drawing Sheets

U.S. PATENT DOCUMENTS

| | | |
|---|---|---|
| 2003/0072397 A1 | 4/2003 | Youggyun |
| 2003/0165187 A1 | 9/2003 | Tesfai et al. |
| 2004/0072546 A1 | 4/2004 | Sugar et al. |
| 2004/0086055 A1* | 5/2004 | Li .............................. 375/260 |
| 2004/0087275 A1 | 5/2004 | Sugar et al. |
| 2004/0114506 A1* | 6/2004 | Chang et al. ................ 370/208 |
| 2004/0136466 A1 | 7/2004 | Tesafai et al. |
| 2004/0209579 A1 | 10/2004 | Vaidyanathan |
| 2005/0053170 A1* | 3/2005 | Catreux et al. ............. 375/267 |
| 2005/0233709 A1* | 10/2005 | Gardner et al. ............. 455/101 |
| 2006/0029168 A1* | 2/2006 | Chuang et al. ............. 375/347 |
| 2006/0251193 A1* | 11/2006 | Kopmeiners et al. ....... 375/345 |

FOREIGN PATENT DOCUMENTS

| | | |
|---|---|---|
| WO | WO 00/77961 A1 | 12/2000 |
| WO | WO 03/023995 | 3/2003 |
| WO | WO 03/075396 | 9/2003 |

OTHER PUBLICATIONS

Schmidt, T.A., et al., "IEEE," "Robus Frequency and Timing Synchronization for OFDM",, p. pp. 1613-1621, (1997).

* cited by examiner

APPARATUS AND METHOD OF MULTIPLE ANTENNA RECEIVER COMBINING OF HIGH DATA RATE WIDEBAND PACKETIZED WIRELESS COMMUNICATION SIGNALS

CROSS-REFERENCES TO RELATED APPLICATIONS

The present application is related to copending and commonly owned U.S. Patent Application filed Oct. 8, 2003 entitled "Apparatus And Method Of Multiple Antenna Transmitter Beamforming Of High Data Rate Wideband Packetized Wireless Communication Signals" with U.S. patent application Ser. No. 10/682,381. The aforementioned application is hereby incorporated by reference.

FIELD OF THE INVENTION

The present invention relates to wireless communications. More particularly, the invention relates to an apparatus and method of multiple antenna receiver combining of high data rate wideband packetized wireless communication signals.

BACKGROUND OF THE INVENTION

Wireless communication systems use antennas to communicate signals. A wireless local area network (WLAN) is a type of wireless communication system that communicates information between nodes in a given area.

Types of Signals

Narrowband and Wideband Signals

Most current wireless communications systems are narrowband signal systems. Narrowband signals have signal bandwidths typically ranging from from tens of kilohertz (kHz) (e.g. 50 kHz) to hundreds of kilohertz (500 KHz). In contrast, wideband, or broadband, signals have signal bandwidths greater than 1 MHz.

802.11 and 802.11a

One type of wideband signal is the signal used in WLANs using the Institute of Electrical and Electronic Engineers (IEEE) 802.11 standard. The IEEE 802.11 standard (802.11) outlines Media Access Control (MAC) and Physical Layer (PHY) specifications for WLANs.

The IEEE 802.11a standard (802.11a) is a part of 802.11 and addresses communications in high data rate wideband packetized wireless communication systems, covering frequencies of operation between 5 GHz and 6 GHz. 802.11a uses orthogonal frequency-division multiplexing (OFDM) modulation, which allows communication to occur at very high data rates by transmitting data over multiple frequency bins over a wide frequency range. Discussions herein applicable to 802.11a are also applicable to IEEE 802.11g. The IEEE 802.11g OFDM standard is the same as 802.11a, with the exception of operating in the 2.4 GHz band. 802.11 takes into account the successful and unsuccessful transmission of packets and includes mechanisms designed for dealing with packet transmission problems. 802.11a wireless communications systems and other wireless communication systems can experience numerous problems during the transmission and reception of signals.

Circuit Impairments

For example, wireless communication systems can encounter problems with circuit impairments in their receiver circuits. In particular, receiver circuits can experience the following circuit impairments: (1) frequency offset; (2) direct current (DC) offset; (3) carrier phase offset, and (4) timing offset.

A typical prior art receiver circuit 100 is depicted in FIG. 1A. Receiver circuit 100 includes an antenna 110, an analog front end 120, and a baseband system 130, logically interconnected as shown in FIG. 1A. Analog front end 120 includes a local oscillator 122, a low noise amplifier (LNA) 123, a mixer 124, analog amplifier 125, and analog filters 126. Baseband system 130 includes an analog-to-digital converter (A/D) 132 and a digital signal processor (DSP) 134. The non-idealities in the components of analog front ends and baseband systems, such as the non-idealities in local oscillator 122, mixer 124, filters 126, A/D 132, and DSP 134, provide the circuit impairments that would be encountered by receiver circuits, such as receiver circuit 100.

Prior art receiver circuits attempt to correct for circuit impairments with circuit impairment cancellation circuitry. For example, in FIG. 1B, prior art receiver circuit 140 includes a modified baseband system 150 logically coupled to analog front end 120. Modified baseband system 150 includes a circuit impairment cancellation unit 152 logically interconnected between A/D 132 and DSP 134. Circuit impairment cancellation unit 152 estimates the circuit impairments from the digital output of A/D 132. Then, circuit impairment cancellation unit 152 cancels the circuit impairments in the signals from A/D 132.

Channel Effects—Fading and Multipath Communication Channels

For example, a wireless communication system could encounter channel effects, such as transmitting signals across a fading communication channel. The fading in the communication channel may be caused by mutipath and propagation loss.

In the case of multipath channel, the RF energy that is transmitted between transmit and receive antennas experiences destructive and constructive interference due to multiple paths taken by the RF energy with multiple delays on the way to a receive antenna. Such multipath interference modulates the phase and attenuates the amplitude of signals across all frequencies and carriers used by a wireless communication system. In a WLAN, such multipath interference could cause a receiver to receive a packet in error or to miss a packet entirely.

Prior art receiver circuits attempt to correct for channel effects, such as fading channels and multipath interference, with channel correction circuitry. For example, in FIG. 1C, prior art receiver circuit 160 includes a modified baseband system 170 logically interconnected with analog front end 120 and a decoder 176. Modified baseband system 170 includes a channel correction unit 172 logically interconnected between A/D 132 and decoder 176. Channel correction unit 172 performs channel equalization on the output of A/D 132 for narrowband signals.

Antenna Diversity

Prior art receiver circuits attempt to correct for channel effects, such as fading channels and multipath interference, with antenna diversity. In a wireless communication system with antenna diversity there is a multiple antenna receiver A receiver with multiple antennas is used so that in the event of poor signal reception due to a fading channel on one antenna, a good channel with no fading will likely exist on another antenna. For example, in FIG. 1D, prior art multiple antenna receiver 180 includes multiple antennas 181, 182, the receive chain 183, and a diversity switch 189, logically interconnected as shown. Receive chain 183 includes an analog front end 185 and a baseband system 187. Analog front end 185 could be like analog front end 120, and baseband system 187 could be like baseband system 130. When a particular communication channel is fading, diversity switch 189 switches from one antenna to another antenna in order to obtain a communication channel that is not fading. Unfortunately, diversity switch 189 causes switch loss in received signals. Moreover, switching diversity provides limited diveristy gain, since only the signal of the selected antenna is used at receiver. Whereas, optimal combining of the signals from the antennas would result in greater diversity gain.

Fast Antenna Switched Diversity

Prior art fast antenna diversity techniques have been used to manage multiple antennas. For example, in a fast antenna diversity communication system with two antennas, when a packet arrives, a first antenna is used to receive the signal. After receiving the signal for a sufficient period of time to judge reception quality, the communication system switches to a second antenna. The second antenna is then used to receive the signal until the quality of reception can be judged. Finally, the system switches to the antenna with the best reception. In some cases, more than two antennas are used in a fast antenna diversity communication system.

Trying and testing multiple antennas using fast antenna diversity typically takes place during a preamble, header, or training portion of the packet being received. The preamble is examined rather than the data so that no data is lost while the different antennas are being tested.

Problems with Fast Antenna Diversity and 802.11a

Fast antenna diversity is undesirable for 802.11a signals and for other high data rate wireless communication signals for several reasons.

Poor Estimation of Channel Quality

First, the packet length of 802.11a signals and other high data rate wireless communication signals leads to a poor estimation of channel quality with fast antenna diversity techniques. For example, the packet preamble in a 802.11a signal is quite short at eight microseconds total duration. A Short preamble is desirable in any high data rate communication system in order to keep the efficiency of the communication system high. As data rates increase, the duration of packets tend to decrease.

Degradation of Communication Performance

In addition, fast antenna diversity degrades the performance of 802.11a and other high data rate wireless communication systems. Time that is consumed in switching and measuring the signals from different antennas reduces the amount of time available to perform other functions that commonly need to be performed during the packet preamble in 802.11a signals and other high data rate wireless communication signals. These functions may include (1) correctly setting the gains of amplifiers in a receive chain, (2) extracting the frequency offset of a received signal, and (3) finding proper symbol boundaries for determining symbol timing. When the preamble is short, the quality of the frequency offset, gain setting, or symbol timing could be compromised if time is spent selecting the best antenna. Therefore, forcing antenna selection into the time of the preamble would degrade the overall performance of high data rate wireless communications systems, such as 802.11a systems.

Difficulty in Detecting Differences Among Antennas

Also, fast antenna diversity switching during the packet preamble creates an additional challenge for wideband signals such as 802.11a OFDM signals. The preamble does not have the frequency resolution to identify narrowband notches in the received signals. Therefore, the preamble can not be used to sense many of the narrow notches within the narrow frequency bands that could occur as a result of multipath interference with wideband signals. A switching decision only based on the preamble power, could cause switching to an antenna with a frequency domain notch, and hence loss of the packet.

An additional challenge for detecting differences among the channels during the packet preamble for certain wideband signals, 802.11a OFDM signals in particular, is that the very small duration of the combined Short and Long training symbol sequences, and in particular the very limited duration of the Short training symbol sequence. Due to this short duration, which provides the desired period of time during when a decision on which one of many different antennas is best to use must be made, conventional techniques that require longer period of time to make such decisions cannot be used.

Combining Signals

Combining the antenna signals is another diversity method. The antenna signals have to be co-phased first and then combined, in order to achieve the coherent combining gain. This task is easier when signals are narrowband and more challenging for wideband signals.

Combining Narrowband Signals

In a narrowband signal wireless communication system, two or more receive signals from two or more antennas generally do not show significant variations across the frequency band (i.e., the signals have a relatively flat response). Thus, the two or more narrowband signals can be coherently combined rather easily using an antenna diversity combining technique with little risk of either (1) losing information by deviating from the true signal or (2) the received signals canceling each other out. Generally, the amplitude and phase responses of narrowband signals do not vary as significantly across the frequency band as the amplitude and phase responses of wideband signals, such as 802.11a signals. Hence, the combining weights for narrowband signals are not frequency dependent and narrowband signals from different antennas can be easily phase corrected and combined.

Problems with Combining Wideband Signals

In contrast to narrowband signals, combining wideband wireless signals is much more complicated via traditional combination methods or conventional narrowband diversity techniques if they are to overcome frequency selectively because of the wide variations in the phase and amplitudes of the signals across the wide frequency bandwidth.

Antenna Diversity Combining

Several conventional antenna diversity combining techniques exist. Many of these techniques are based on examining a combination of signals from two or more antennas. One combining method is maximal ratio combining (MRC) where signals coming from two or more antennas are cophased and weighted proportionally to their signal-to-noise ratios (SNRs) and are added together to form a weighted combination signal. MRC results in optimal SNR improvement, where the combined signal SNR is equal to the sum of SNRs for each antenna signal.

Another combining method is Equal Gain Combining (EGC). In equal gain combining, weights with same magnitudes and different phases are used for all signals. Referring to FIG. 1E, prior art equal gain combiner 190 includes analog front ends 191, 192, baseband units 194, 195, phase correction units 196, 197, and the summer 198, logically interconnected as shown. However, EGC's performance is suboptimal, where the combined SNR is typically higher than each antenna SNR, but smaller than the sum of SNRs.

Such prior art antenna diversity combining techniques may work well for narrowband signals, where the phase and weights are not frequency dependent. However, the conventional techniques do not work well for wideband signals that have received phase and power that are not constant over the received signal bandwidth and that are frequency dependent, such as 802.11a signals. Therefore, conventional antenna diversity combining techniques are not applicable to wideband signal wireless communication signals, such as 802.11a signals.

Therefore, a cost effective and efficient multiple antenna receiver antenna combining technique that is suited to confront the challenges posed by high data rate wideband packetized wireless communication signals, such as 802.11a signals, and that implements frequency dependent weighting in combining such signals is needed. Thus, the present invention provides an efficient and low cost system and method of multiple antenna receiver combining of high data rate wideband packetized wireless communication signals.

SUMMARY OF THE INVENTION

The present invention provides an apparatus and method of multiple antenna receiver combining of high data rate wideband packetized wireless communication signals.

In an examplary embodiment, the invention provides an apparatus for combining of M high data rate wideband packetized OFDM wireless communication signals ("M signals") to form a combined output signal, wherein M receive antennas each receive one of the M signals, wherein each of the M signals includes N frequency bins, and wherein M is an integer greater than or equal to 2 and N is a positive integer. In a preferred embodiment, the apparatus includes a joint timing recovery unit that performs joint coarse signal timing estimation, joint fine timing estimation and joint frequency offset estimation on digital data corresponding to each of the M signals. It also includes M Fast Fourier Transform (FFT) units that each convert the digital data for one of the M signals into frequency domain information in the form of sub-carrier data for each of N frequency bins for that one M signal. It further includes a combiner that weights and combines the frequency domain information of the M FFT units to thereby generate the combined output signal having reduced circuit impairments and channel effects.

In an exemplary embodiment, the joint timing recovery unit includes a joint coarse signal timing estimation unit that performs the joint coarse signal timing estimation using each of the M signals. In an exemplary embodiment, the number of antennas M is one, in which case, the summer in the joint coarse timing estimation unit will have a single input.

In an exemplary embodiment, the joint timing recovery unit includes a joint frequency offset estimation unit that performs the joint frequency offset estimation on all of the signals.

In another embodiment, the system is conFig.d of both transmitters and receivers, each having multiple antennas. In a particular embodiment, a slow antenna switching technique is used to select one from a number of different transmit antennas, whereas a fast antenna switching technique is used to select one from a number different receive antennas.

The present invention also provides a method for combining of M high data rate wideband packetized OFDM wireless communication signals ("M signals") to form a combined output signal, wherein M receive antennas each receive one of the M signals, wherein each of the M signals includes N frequency bins, and wherein M is an integer greater than or equal to 2 and N is a positive integer. The method comprises the steps of performing joint coarse signal timing estimation and joint frequency offset estimation on digital data corresponding to each of the M signals; converting the digital data for each of the M signals into frequency domain information in the form of sub-carrier data for each of N frequency bins for that each of the M signals and outputting the frequency domain information for each of the M signals; and weighting and combining the frequency domain information to thereby generate the combined output signal having reduced circuit impairments and channel effects.

BRIEF DESCRIPTION OF THE DRAWINGS

FIGS. 3A-1 and 3A-2 illustrate embodiments of a joint coarse signal timing estimation system in accordance with the present invention.

FIGS. 3B-1 and 3B-2 illustrate embodiments of a joint frequency offset estimation system in accordance with the present invention.

DETAILED DESCRIPTION OF THE INVENTION

Figure 1A:
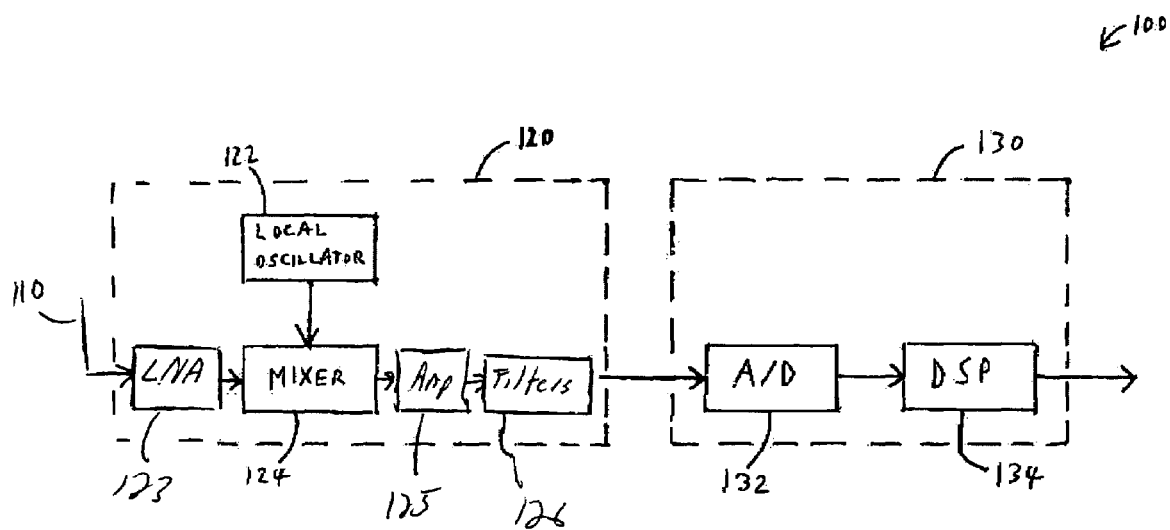
FIG. 1A is a diagram of a prior art receiver circuit.
Figure 1B:
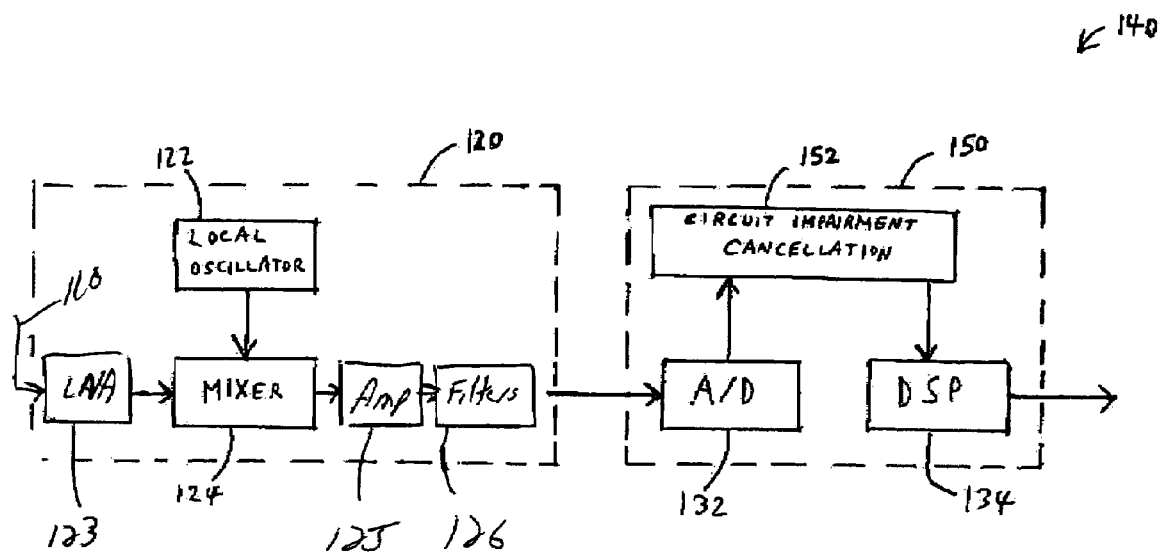
FIG. 1B is a diagram of a prior art receiver circuit with circuit impairment cancellation circuitry.
Figure 1C:
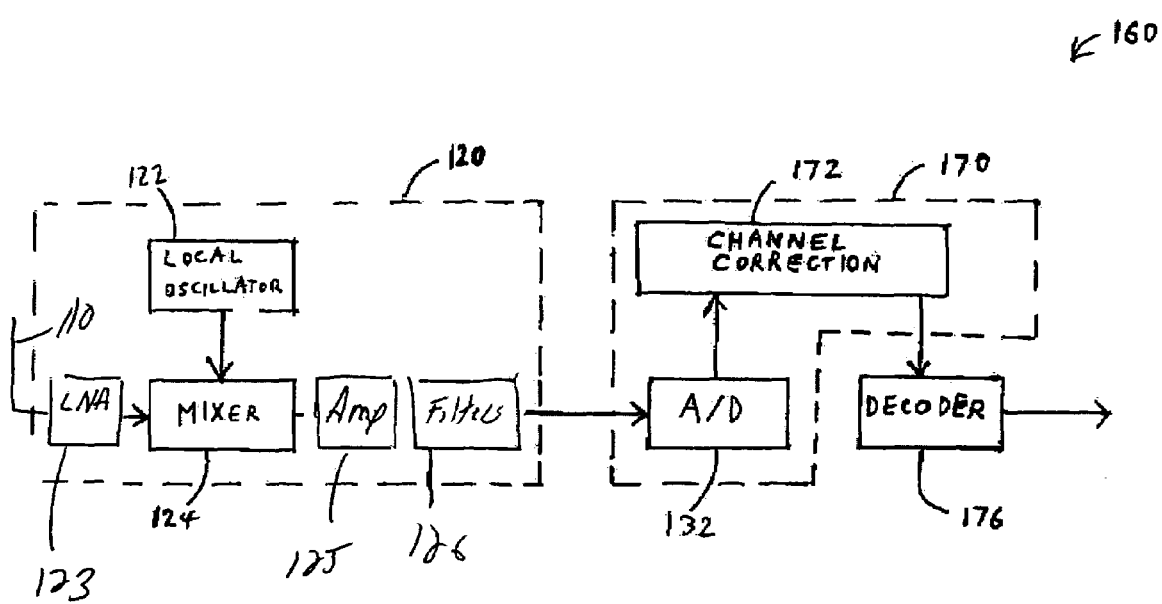
FIG. 1C is a diagram of a prior art receiver circuit with channel correction circuitry.
Figure 1D:
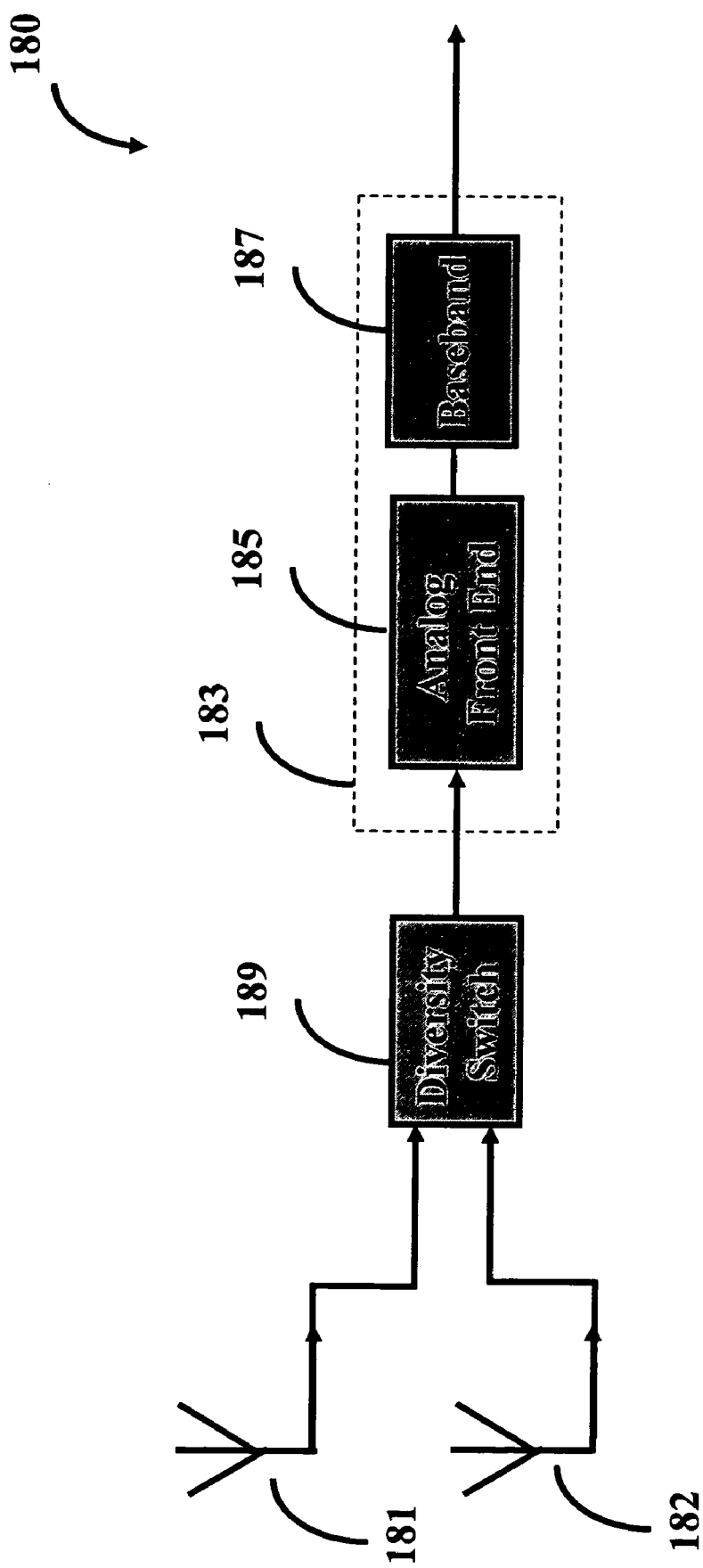
FIG. 1D is a diagram of a prior art multiple antenna receiver.
Figure 1E:
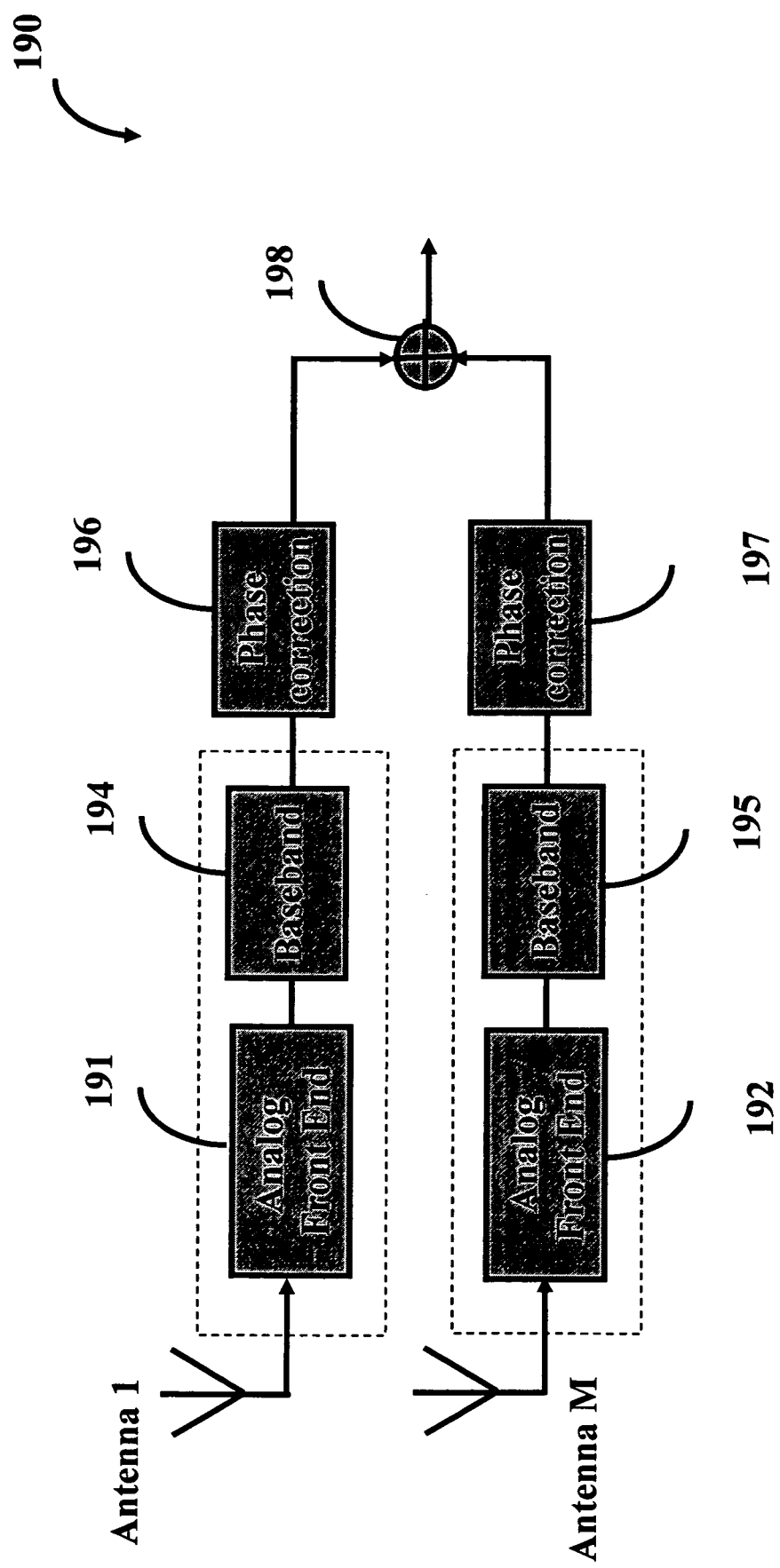
FIG. 1E is a diagram of a prior art equal gain combiner.
Figure 2:
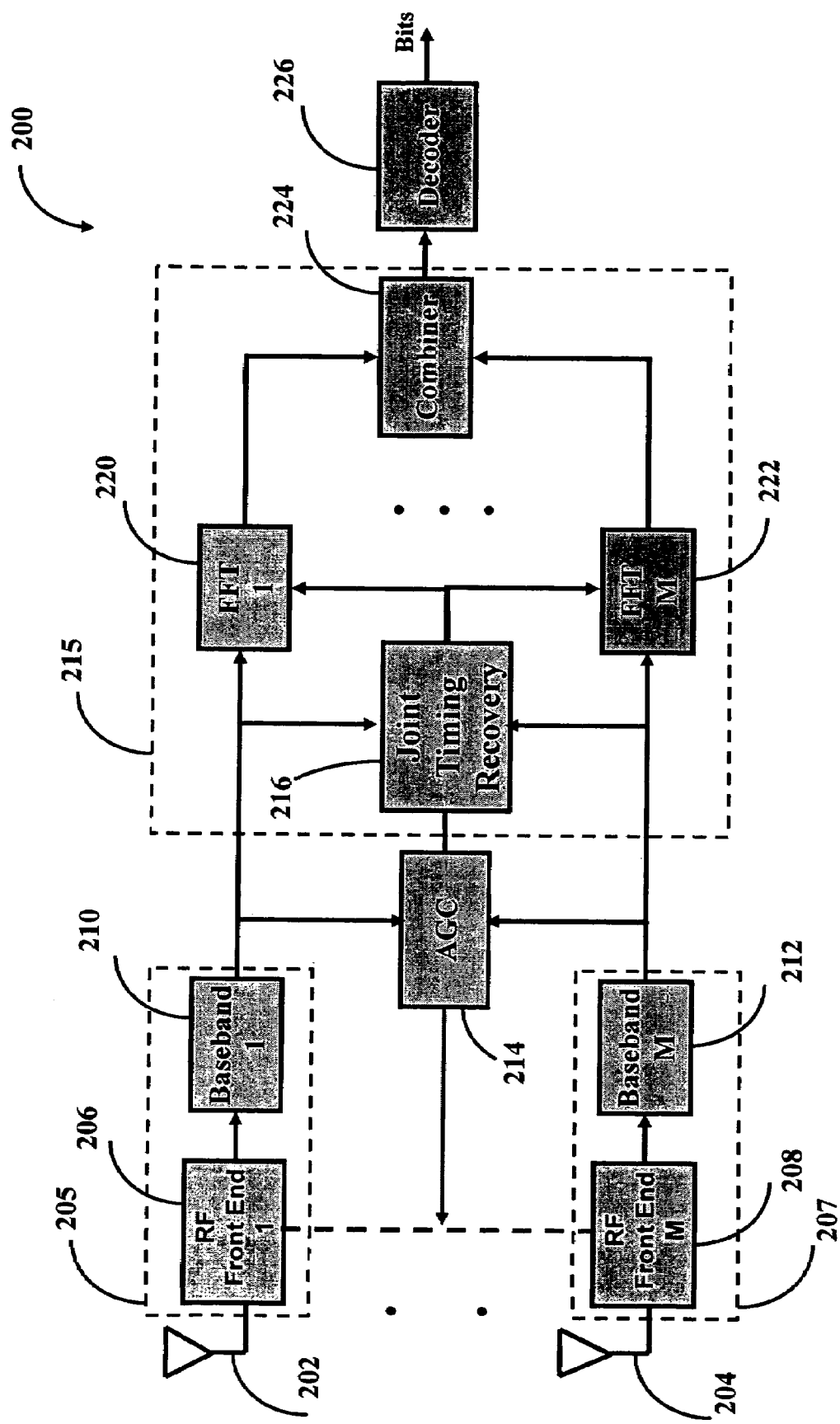
FIG. 2 is a block diagram of a multiple antenna receiver combiner in accordance with an exemplary embodiment of the present invention.

The present invention provides a system and method of multiple antenna receiver combining of high data rate wideband packetized wireless communication signals. In an exemplary embodiment, high data rate wideband wireless communication signals are packetized OFDM signals, and may be mobile, such as with a driver in a moving vehicle, or movable, such as movement within the confines of a building. To the extent that mobility is discussed herein, reference will be made to mobile, although it will be understood that this applies also to a movable. Referring to FIG. 2, in an exemplary embodiment, the present invention provides a multiple antenna receiver combiner 215 that includes a joint timing recovery unit 216, M FFTs 220, 222, and a combiner 224, logically interconnected as shown, where M is an integer greater than or equal to 2. In an exemplary embodiment, the high data rate wideband packetized wireless communication signals are 802.11a signals. In an exemplary embodiment, M equals 2.

In another exemplary embodiment, M equals 4.

Multiple antenna receiver combiner 215 is logically interconnected, as shown in FIG. 2, with M antennas 202, 204, M receive chains 205, 207, an automatic gain control unit ("AGC") 214, and a decoder 226, to form a multiple antenna receiver 200. As shown in FIG. 2, receive chain 205 includes a RF front end 206 and a Baseband unit 210, that are logically interconnected, while receive chain 207 includes a RF front end 208 and a Baseband unit 212, that are logically interconnected.

The multiple antenna RF front end includes M independent RF chains, including M synthesizers, with a common crystal. The common crystal will ensure common timing between the multiple chains. While the independent RF front ends will have independent phase noise, the methods and systems of combining provided by this invention are tolerant to independent phase noise.

In another embodiment, the multiple antenna RF front end includes M independent RF chains, and K synthesizers with a common crystal, where K is an integer smaller or equal to M. In this embodiment one synthesizer could be common to two or more chains. AGC 214 adjusts the gain of signals received by multiple antenna receiver 200 across all carriers and frequencies such that later stages in multiple antenna receiver 200 can detect the signals. Copending U.S. patent application Ser. No. 09/849,442 entitled "In-Band And Out-Of-Band Signal Detection For Automatic Gain Calibration Systems" and filed on May 4, 2001 and Ser. No. 10/367,049 entitled "Method And Apparatus For Maximizing Receiver Performance Utilizing Mid-Packet Gain Changes" and filed on Feb. 14, 2003 describes exemplary AGC's, such as AGC 214, and the aforementioned applications are hereby incorporated by reference.

Operation

Multiple antenna receiver combiner 215 performs receive antenna diversity combining such that high data rate a wideband packetized wireless communication signal is received on antennas 202, 204 are combined on a per-subcarrier basis. Therefore, for frequency-selective channels, the nulls in one antenna could be compensated for by contributions of the same subcarrier in another antenna. This mitigates the multipath effects of the channel. In addition, since multiple antenna receiver combiner 215 does not require a diversity switch, such as diversity switch 189, switch-loss is reduced. In addition, with multiple antenna receiver combiner 215, since the "optimal" use of each receive antenna 202, 204 is automatically effected upon receiving the packet, switching based diversity is not required. This mitigates the effect of fading on the wireless channels. Lastly, the average SNR at the output of multiple antenna receiver combiner 215 equals the sum of the SNRs of each chain 205, 207. Thus, multiple antenna receiver combiner 215 helps mitigate channel effects while providing power, and SNR gain.

As shown in FIG. 2, each antenna 202, 204 is connected directly to its own receive chain 205, 207. RF front ends 206, 208 demodulate signals received on antennas 202, 204 into baseband signals. Baseband units 210, 212 convert the baseband signals into digital signals. AGC 214 optimally sets the gains for receive chains 205, 207. The AGC 214, samples the output of the Baseband units 210-212 and accordingly sets the analog gains of the RF front ends 206-208. (Then,) The joint timing recovery unit 216 jointly (1) performs coarse signal timing estimation and (2) fine signal timing estimation and (3) joint frequency offset estimation. The output of the Baseband units 210-212, all time domain signals, which include the Long training symbols used for channel estimation are fed to FFTs 220, 222. Combiner 224 weights and combines the outputs of FFTs 220, 222 on a per sub-carrier basis, for each of the received frequencies, to yield a joint signal. Finally, decoder 226 decodes the joint signal output of combiner 224. In an exemplary embodiment, decoder 226 is a Viterbi decoder.

Timing Recovery

As shown in FIG. 2, joint timing recovery unit 216 processes the baseband outputs of Baseband units 210, 212 in the time domain by performing several tasks. In particular, joint timing recovery unit 216 performs (1) joint coarse signal timing estimation, (2) joint frequency offset estimation, and (3) joint fine timing estimation on the outputs of Baseband units 210, 212.

Joint Coarse Signal Timing Estimation

Joint timing recovery unit 216 performs joint coarse signal timing estimation on the outputs of Baseband units 210, 212. Thus, joint timing recovery unit 216 indicates to AGC 214 when data begins on the signals outputted by Baseband units 210, 212. Joint coarse signal timing estimation includes estimating the coarse signal timing jointly for all of the receive chains 205, 207 in multiple antenna receiver 200. Thus, joint coarse signal timing estimation determines the start time of signals received by the multiple antenna receiver 200, by identifying the starting time of the Long training symbols, corresponding to the end time of the Short training symbols.

Figures 1, 3A:
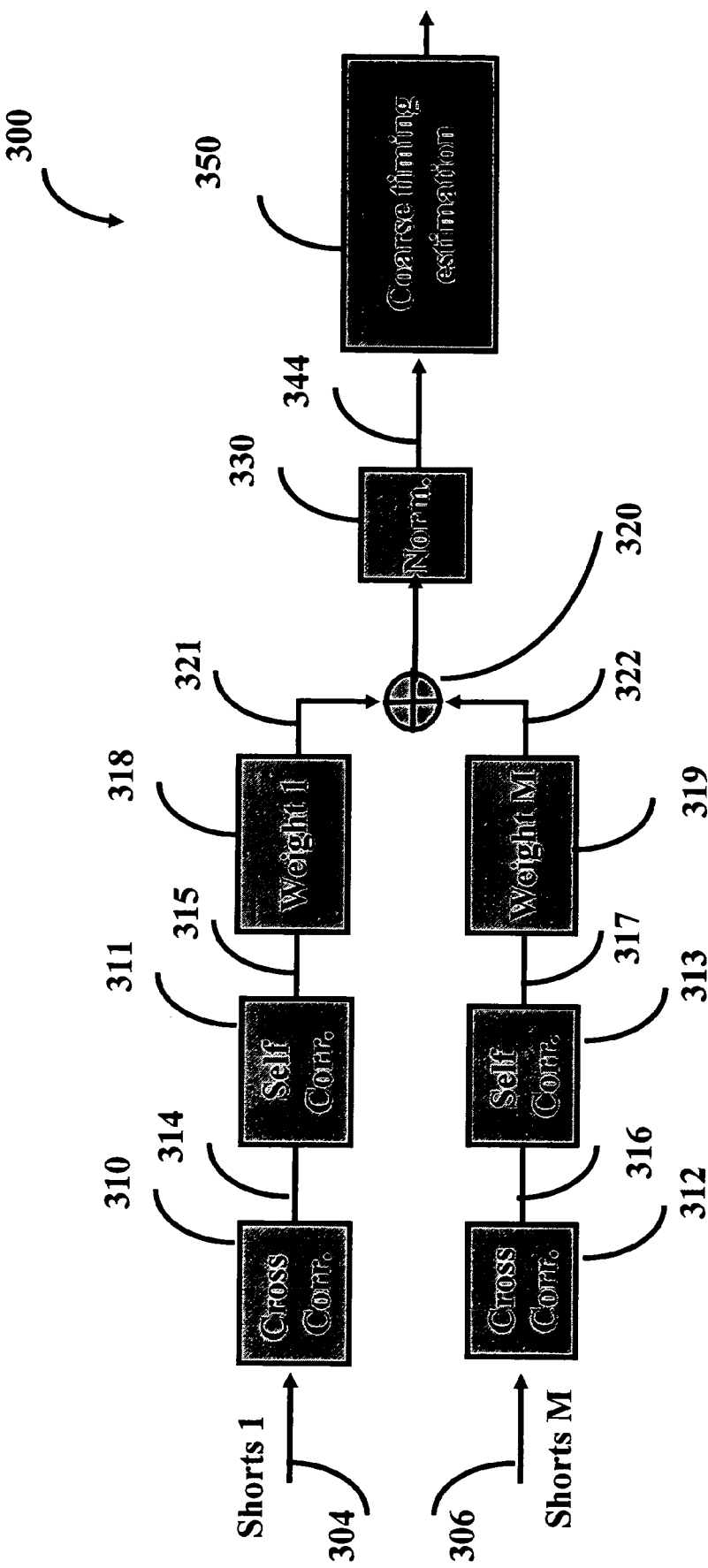
Figures 2, 3A:
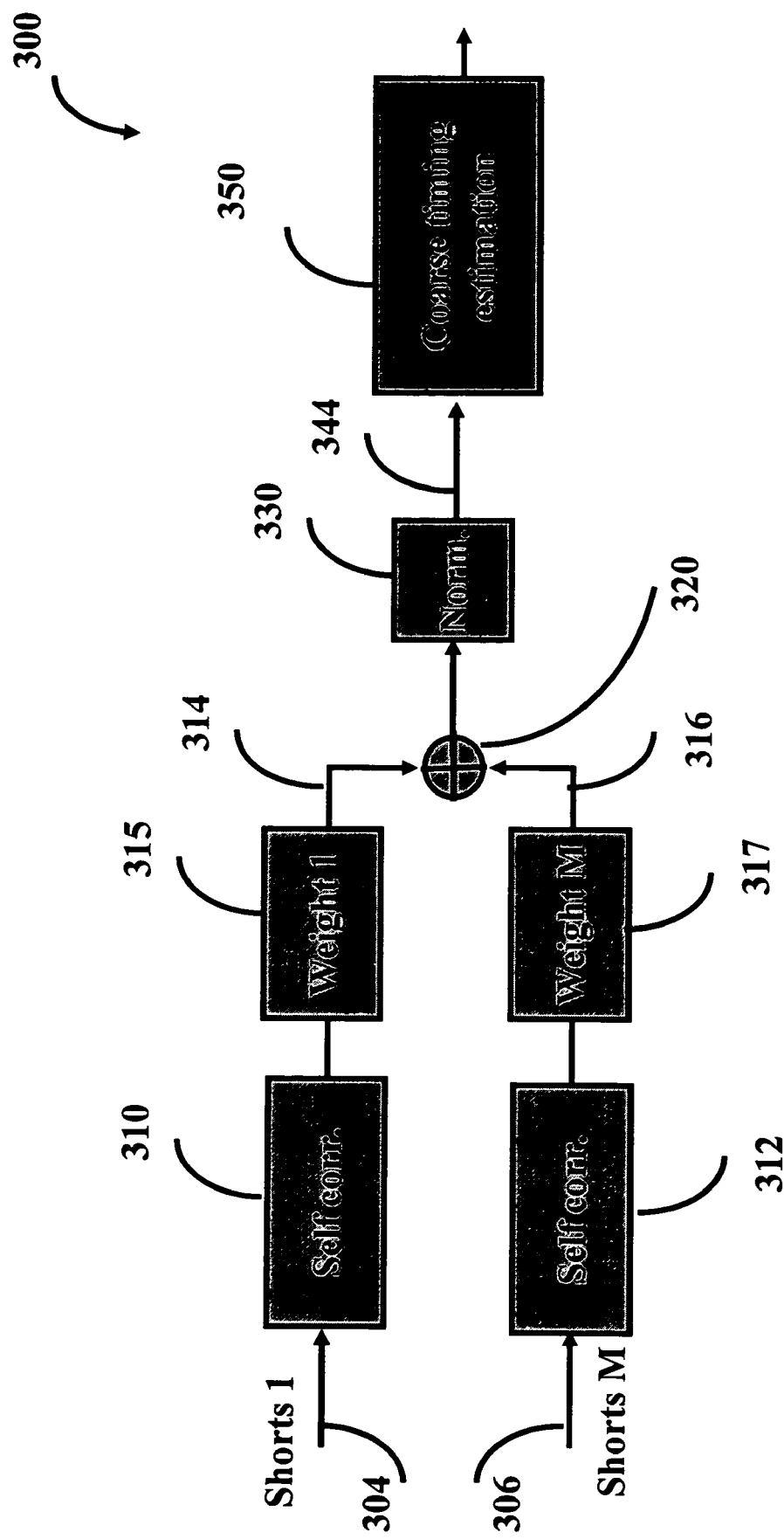

Referring next to FIG. 3A-1, in an exemplary embodiment, joint coarse signal timing estimation is performed on the outputs of Baseband units 210, 212 by a joint coarse signal timing estimation system 300. Joint coarse signal timing estimation system 300 includes M cross-correlation units 310, 312, M self-correlation units 311, 313, M weighting units 318, 319, a summer 320, a normalizing unit 330, and a coarse timing estimation unit 350, logically interconnected as shown in FIG. 3A-1.

In another embodiment, joint coarse signal timing estimation system 300 includes M self-correlation units 310, 312, M weighting units 315, 317, a summer 320, a normalizing unit 330, and a coarse timing estimation unit 350, logically interconnected as shown in FIG. 3A-2.

Operation of Joint Coarse Signal Timing Estimation Using Combined Cross Correlation and Self Correlation Joint coarse signal timing estimation system 300 shown in FIG. 3A-1 performs coarse signal timing estimation by finding the transition time indicated by a drop in self-correlation power relative to the signal power in the outputs received from Baseband units 210, 212.

While cross-correlation unit 310 obtains P Shorts 304 from the packet header of a received packet in the output received from Baseband unit 210, cross-correlation unit 312 obtains P Shorts 306 from the packet header of a received packet in the output received from Baseband unit 212, where P is a positive integer. Each Short is a training symbol with a self-correlating property. When a received Short is cross-correlated, the received Short is correlated with another known Short sequence(noiseless), and a stronger signal is obtained while noise is reduced. In an exemplary embodiment, P is less than or equal to 10, the number of Shorts in an 802.11a packet.

Cross-correlation units 310, 312 independently cross-correlate received Shorts 304, 306, with a known Short sequence, respectively. As a result, cross-correlation units 310, 312 output M cross correlation signals 314, 316 that are the cross-correlation of received Shorts 304, 306, with the known Short sequence.

Self-correlation units 311,313 independently self-correlate the outputs of units 310-312. As a result, the self-correlation units 311, 313 output M co-phased correlation signals 315,317, that can be combined coherently.

Weighting units 318,319, weight the self correlation outputs based on the signal strength. Therefore, a stronger signal will have a larger contribution to the combined self correlation.

Summer 320 sums signals 321, 322, thereby allowing noise in signals 321, 322 to be reduced. Next, normalizing unit 330 normalizes the output of summer 320 by the signal power.

Thereafter, coarse timing estimation unit 350 obtains the end time of the Short training symbols by comparing the drop in output 344 power relative to the signal power to a threshold. The threshold depends on the hardware implementation, however it is set such that to minimize probability of false detections and mis-detections. Copending U.S. patent application Ser. No. 09/963,115 entitled "Fine Frequency Offset Estimation And Calculation And Use To Improve Communication System Performance" filed on Sep. 24, 2001 describes an exemplary coarse timing estimation unit, such as coarse timing estimation unit 340, and is hereby incorporated by reference.

Operation of Joint Coarse Signal Timing Estimation Using Only Self-correlation

As shown in FIG. 3A-2, joint coarse signal timing estimation system 300 performs coarse signal timing estimation by finding the transition time indicated by a drop in self-correlation power relative to the signal power in the outputs received from Baseband units 210, 212.

While self-correlation unit 310 obtains P Shorts 304 from the packet header of a received packet in the output received from Baseband unit 210, self-correlation unit 312 obtains P Shorts 306 from the packet header of a received packet in the output received from Baseband unit 212, where P is a positive integer. Each Short is a training symbol with a self-correlating property. When a Short is self-correlated, the Short is correlated with itself. In an exemplary embodiment, P equals 10, the number of Shorts in a 802.11a packet.

Self-correlation units 310, 312 independently self-correlate received Shorts 304, 306, respectively.

Weighting units 315,317, weight the self correlation outputs based on the signal strength. Therefore, a stronger signal will have a larger contribution to the combined self correlation.

Summer 320 sums the outputs 314, 316 of the weighting units, thereby allowing noise in signals 314, 316 to be reduced. Next, normalizing unit 330 normalizes the output of summer 320 by the signal power.

Thereafter, coarse timing estimation unit 350 obtains the end time of the Short training symbols by comparing the drop in output 344 power relative to the signal power to a threshold. The threshold depends on the hardware implementation, however it is set such that to minimize probability of false detections and mis-detections.

Joint Frequency Offset Estimation

In addition, joint timing recovery unit 216 performs joint frequency offset estimation, preferably across all carriers and frequencies received by multiple antenna receiver 200. Thus, joint timing recovery unit 216 corrects the frequency offset in the signals outputted by Baseband units 210, 212. Joint frequency offset estimation includes estimating the frequency offset jointly for all of the receive chains 205, 207 in multiple antenna receiver 200.

Figures 1, 3B:
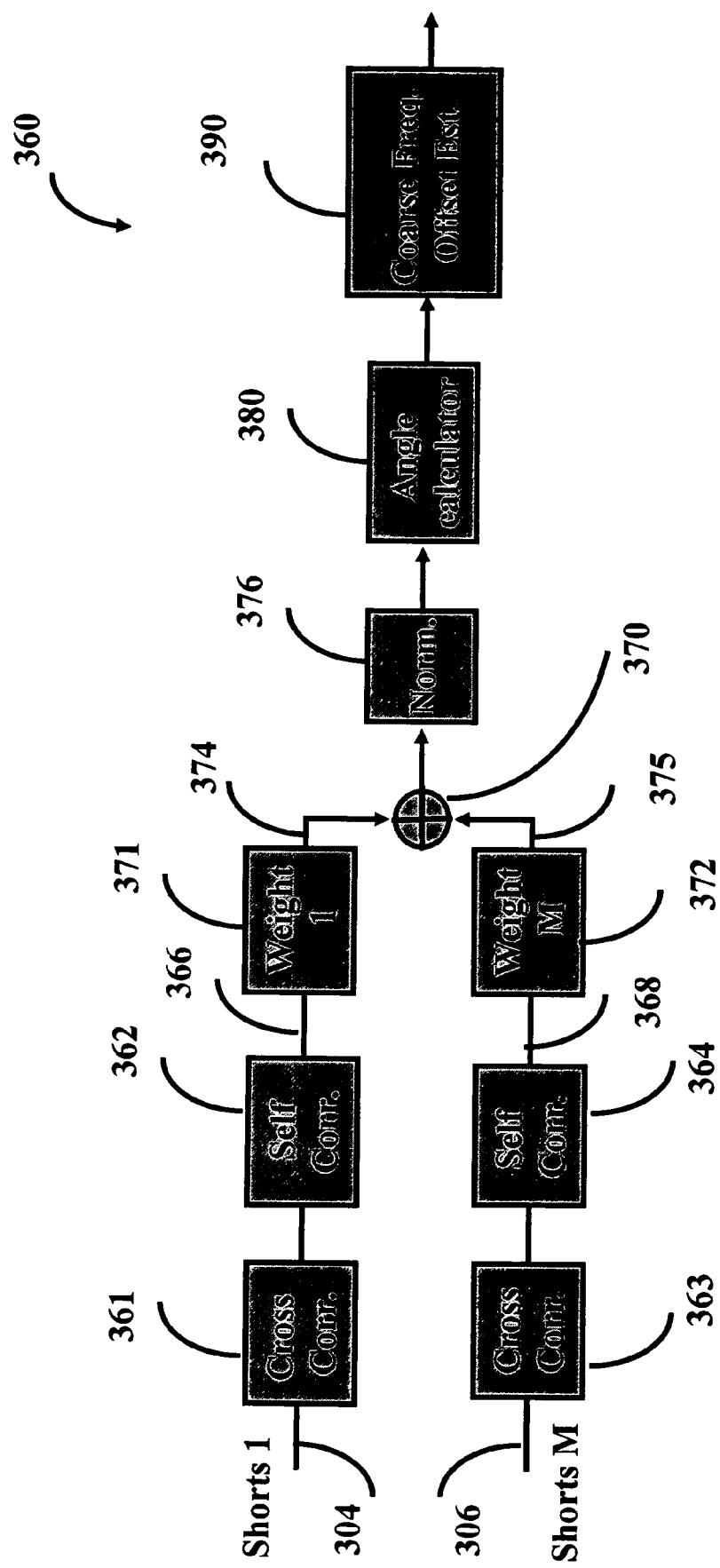
Figures 2, 3B:
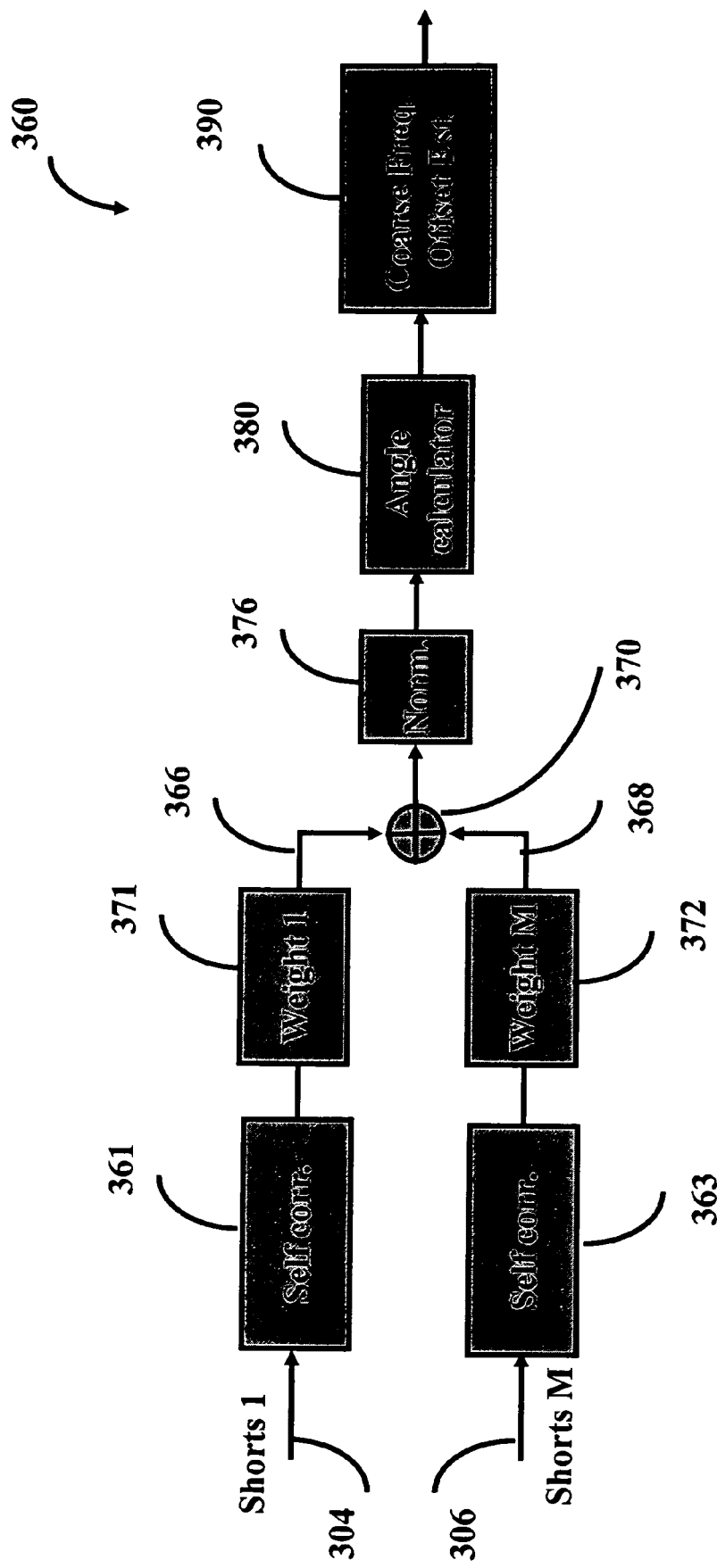

Referring to FIG. 3B-1, in an exemplary embodiment, joint frequency offset estimation is performed by a joint frequency offset estimation system 360. Joint frequency offset estimation system 360 includes M cross-correlation units 361, 363, M self-correlation units 362, 364, M weighting units 371, 372, a summer 370, a normalizing unit 376, an angle calculator 380, and a coarse frequency offset estimation unit 390, logically interconnected as shown in FIG. 3B-1.

Referring to FIG. 3B-2, in another exemplary embodiment, joint frequency offset estimation is performed by a joint frequency offset estimation system 360. Joint frequency offset estimation system 360 includes M self-correlation units 361, 363, M weighting units 371, 372, a summer 370, a normalizing unit 376, an angle calculator 380, and a coarse frequency offset estimation unit 390, logically interconnected as shown in FIG. 3B-2.

Operation of Joint Frequency Offset Estimation Using Combined Cross-correlation and Self-correlation As shown in FIG. 3B-1, joint frequency offset estimation system 360 performs joint frequency offset estimation on the signals received from Baseband units 210, 212 in several stages.

While cross-correlation unit 361 obtains P Shorts 304 from the packet header of a received packet in the output received from Baseband unit 210, cross-correlation unit 363 obtains P Shorts 306 from the packet header of a received packet in the output received from Baseband unit 212. Cross-correlation units 361, 363 independently cross-correlate the received Shorts 304, 306, with a known Short sequence, respectively.

Self-correlation units 362,364 independently self-correlate the outputs of units 361-363. As a result, the self-correlation units 362, 364 output M co-phased correlation signals 366,368, that can be combined coherently.

Weighting units 371,372, weight the self correlation outputs based on the signal strength. Therefore, a stronger signal will have a larger contribution to the combined self correlation.

Summer 370 sums signals 374, 375, thereby allowing noise in signals 374, 375 to be reduced. Normalizing unit 376 normalizes the output of summer 370 by the signal power. This normalization stage is optional whenever the self correlation is used for calculating the angle; since only the phase information is used for angle calculations.

Next, angle calculator 380 extracts the angle from the output of normalizing unit 376, and, thereafter, coarse frequency offset estimation unit 390 obtains the frequency offset of the angle, as is known.

Operation of Joint Frequency Offset Estimation Using Self-correlation Only

As shown in FIG. 3B-2, joint frequency offset estimation system 360 performs joint frequency offset estimation on the signals received from Baseband units 210, 212 in several stages.

While self-correlation unit 361 obtains P Shorts 304 from the packet header of a received packet in the output received from Baseband unit 210, self-correlation unit 363 obtains P Shorts 306 from the packet header of a received packet in the output received from Baseband unit 212. Self-correlation units 361, 363 independently self-correlate received Shorts 304, 306, respectively.

Weighting units 371,372, weight the self correlation outputs based on the signal strength. Therefore, a stronger signal will have a larger contribution to the combined self correlation.

Summer 370 coherently sums the weighted self-correlator output 366, 368, thereby allowing noise in 366, 368 to be reduced. Normalizing unit 376 normalizes the output of summer 370 by the signal power.

This normalization stage is optional whenever the self correlation is used for calculating the angle; since only the phase information is used for angle calculations.

Next, angle calculator 380 extracts the angle from the output of normalizing unit 376 and, thereafter, coarse frequency offset estimation unit 390 obtains the frequency offset of the angle, as is known.

Joint Fine Timing Estimation

Also, joint timing recovery unit 216 performs joint fine timing estimation on the outputs of Baseband units 210, 212. The fine timing entails estimating a linear phase ramp of each of the M signals across the signal frequency band. The fine timing offset of the signal is extracted jointly from the M linear phase ramp estimates. In an embodiment of the invention, a fine timing offset is a weighted average of the linear phase ramp estimates. The phase ramp is normally estimated using the Long training sequence, as is known.

Fast Fourier Transforms

Referring to FIG. 2, FFTs 220, 222 output frequency domain information, for the N frequency bins received by multiple antenna receiver 200. Each FFT 220, 222 outputs frequency domain information sequentially for each received frequency bin. Thus, for the ith received frequency bin, $f_i$, both FFT 220 and FFT 222 output ith frequency domain information consisting of an amplitude$_i$ and a phase$_i$. In an exemplary embodiment, N equals 64, which is the number of frequency bins in 802.11a. In another exemplary embodiment, N equals 128. This is when an oversampling factor of 2 is used to sample input data stream. U.S. Pat. No. 6,507,619, and Copending U.S. patent application Ser. No. 09/816,810 entitled "Decoding System And Method For Digital Communications" filed on Mar. 23, 2001, which is a CIP of U.S. Pat. No. 6,507,619 describe exemplary FFTs, such as FFTs 220, 222.

Combiner

Figure 4:
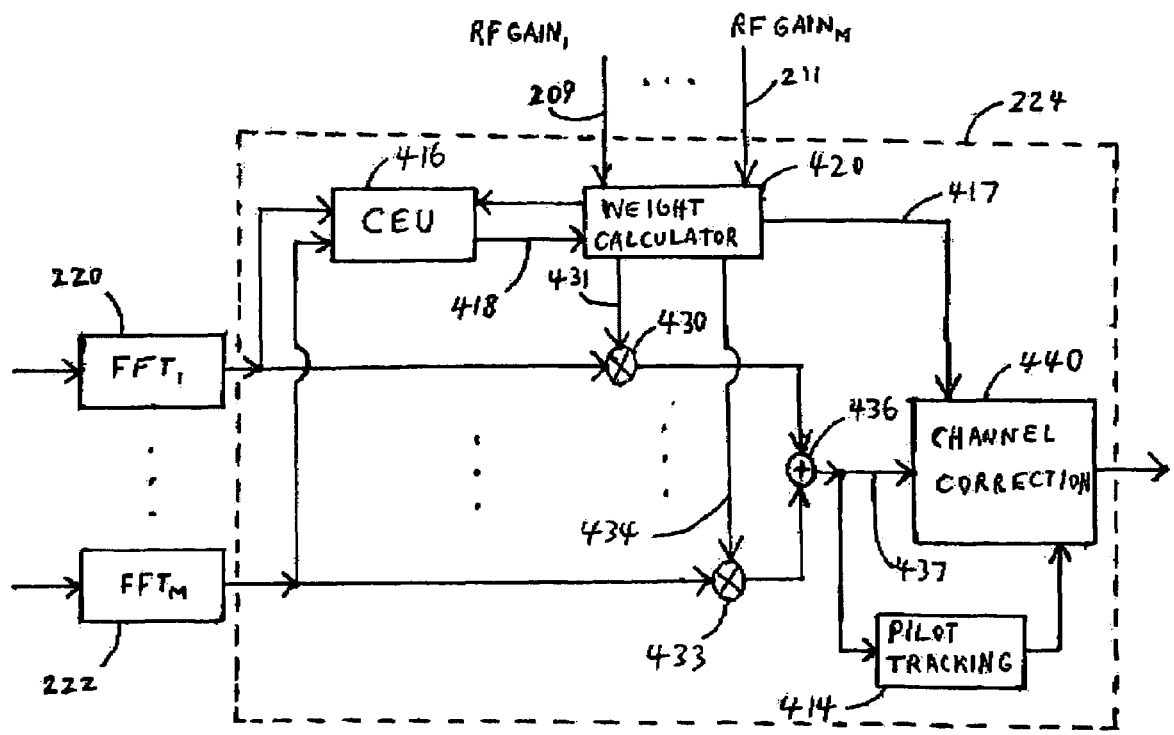
FIG. 4 is a block diagram of a combiner in accordance with an exemplary embodiment of the present invention.

For each frequency received by multiple antenna receiver 200, combiner 224 combines the outputs of FFTs 220, 222. Referring to FIG. 4, in an exemplary embodiment, combiner 224 includes a CEU 416, a weight calculator 420, M weight blocks 430, 433, a summer 436, a pilot tracking unit 414, and a channel correction unit 440, logically interconnected as shown.

For each received frequency, $f_i$, combiner 224 (1) corrects the phase offset in the outputs of FFTs 220, 222 with four pilots and (2) corrects the DC offset and any attenuation due to channel effects by adjusting the amplitudes of the outputs of FFTs 220, 222.

Operation of the Combiner

CEU (Channel Estimation Unit)

For each $f_i$, CEU 416 receives the outputs of FFTs 220, 222 and outputs M channel estimates 418 to weight calculator 420. Channel estimate 418 includes M channel estimates, $\hat{H}_1, \ldots, \hat{H}_M$. For each received frequency, CEU 416 outputs combined channel estimate having a value given by the following equation:

$$\text{channel estimate} = \hat{H}_1 W_1 + \ldots + \hat{H}_M W_M$$

$\hat{H}_1$ is the channel estimate of the first channel, $H_1$, based on the output of FFT 220, while $\hat{H}_M$ is the channel estimate of the Mth channel, $H_M$, based on the output of FFT 222. $W_1$ is the combining weight for antenna 1, and $W_M$ is the combining weight for antenna M at frequency $f_i$. The weight are obtained as described in the Weight Calculator section.

Viterbi Weighting

The above estimated combined channel is used also to generate the Viterbi weights for the decoder. U.S. Pat. No. 6,507,619, and Copending U.S. patent application Ser. No. 09/816,810 entitled "Decoding System And Method For Digital Communications" filed on Mar. 23, 2001, which is a CIP of U.S. Pat. No. 6,507,619 describe Viterbi weighting and are hereby incorporated by reference.

As for the single antenna case, subject of U.S. Pat. No. 6,507,619, and Copending U.S. patent application Ser. No. 09/816,810 entitled "Decoding System And Method For Digital Communications" filed on Mar. 23, 2001, which is a CIP of U.S. Pat. No. 6,507,619, the Viterbi weighting is based on channel estimate magnitude response and not channel estimate power. Therefore, in the multiple antenna case, the combined channel estimate magnitude for each frequency bin is used as a weighting factor by the viterbi decoder unit to decode bits in the corresponding frequency bins.

Weight Calculator

For each received frequency, weight calculator 420 receives M analog gains 209, 211, where analog gain 209 is associated with receive chain 205 and analog gain 211 is associated with receive chain 207. For each $f_i$, weight calculator 420 (1) receives the channel estimates from the CEU 416 and (2) outputs M weights 431, 434 to weight blocks 430, 433, respectively.

For each received frequency, $f_i$, weight calculator 420 outputs to first weight block 430 a first weight 431 that includes a first weighting value multiplied by first gain adjustment. The first weight is obtained by passing the conjugate of $\hat{H}_1$ through a smoothing filter, while the first gain adjustment has a value of $(G_{min}/G_1)^2$, where $G_{min}$ is the minimum of the M analog gains $G_1$ (209), $G_M$ (211). The smoothing filter, is a low pass filter that removes noise from the estimated weights, and is needed for very low SNR operation, when the channel estimates are very noisy. In addition, for each received frequency, weight calculator 420 outputs to weight block 433 a Mth weight 434 that includes a Mth weighting value and a Mth gain adjustment. The Mth weighting value is obtained by passing the conjugate of $\hat{H}_M$, through the smoothing filter, while the Mth gain adjustment has a value of $(G_{min}/G_M)^2$.

Methods of Gain Adjustment

The weights should account for difference in gains between the multiple receiving chains.

These gains include:
1. The total analog gains, RF, IF and baseband;
2. Difference in noise floor between the chains, which corresponds to a gain difference between the chains; and
3. The total digital gains, which includes the digital scaling gains. Digital scaling gains are used to scale up or down data or channel estimates to achieve full resolution at the ADC.

Preferably, the product of the above gains are represented by the gain factor G in the weight calculation block.

Decision Feedback for Channel/Weight Estimation

In another embodiment of the weight calculator, decision feedback is used to enhance the channel estimates, and therefore the weights. Decision feedback data can be used from the output of the viterbi decoder or from hard decision decoded data symbols at the input to the Viterbi decoder. In a preferred embodiment the hard decision decoded data symbols at the input to the Viterbi decoder are used. The decoded data symbols at the output of the Viterbi decoder are error corrected and therefore are more reliable, however they are available after a long Viterbi decoder processing delay of 5-10 symbols.

The output of the FFT unit is divided by the hard decoded data at the input of the Viterbi decoder, which is used as a new channel estimate. The phase of this new estimate is corrected, and the new estimate is averaged with the existing channel estimate, which results in averaging out noise, and leading to a better channel estimate used for calculating combining weights. This process can be repeated using many hard decoded data symbols.

In an exemplary embodiment, less than or equal to 10 hard decision decoded data symbols are used. U.S. Pat. No. 6,507,619, and Copending U.S. patent application Ser. No. 09/816,810 entitled "Decoding System And Method For Digital Communications" filed on Mar. 23, 2001, which is a CIP of U.S. Pat. No. 6,507,619 describe decision feedback and are hereby incorporated by reference.

Weight Blocks

In an exemplary embodiment, for each received frequency, $f_i$, while weight block 430 multiplies the output of FFT 220 by weight 431, weight block 433 multiplies the output of FFT 222 by weight 434.

Summer (Combiner)

For each received frequency, summer 436 sums the outputs of weight blocks 430, 433. For each received frequency, $f_i$, summer 436 outputs combined frequency domain information, a combined amplitude$_i$ and a combined phase$_i$. Also, for each of the received signals, summer 436 outputs Q combined pilot signals, where Q is a positive integer.

Pilot Tracking Unit

For each of the received signals, pilot tracking unit 414 receives the output of summer 436 and provides phase correction information to channel correction unit 440. The Pilot tracking unit estimates the phase of each pilot in the pilot frequency bins, and compares that against the known pilot phase, and uses the difference to correct the phase of the data signals on all other frequency bins Pilot tracking unit 414 performs phase correction by using the Q combined pilot signals from summer 436 in order to determine the phase offset since the phases of the pilot signals are known. In an exemplary embodiment, Q equals 4, the number of pilots in a 802.11a signal.

In an exemplary embodiment, for each received frequency, pilot tracking unit 414 combines the Q combined pilots, thereby reducing the noise of the Q combined pilots.

Channel Correction Unit

Finally, for each received frequency, channel correction unit 440 (1) receives the combining weights 417 from weight calculator 420, the output of summer 436, and pilot tracking information from pilot tracking unit 414 and (2) calculates the inverse of the combined weighted channel, and (3) multiplies the combined data signal output by the inverse of the combined channel. In an exemplary embodiment, for each received frequency, $f_i$, channel correction unit 440 divides the output of summer 436, combined channel 437, by the square root of combined channel 437 in order to minimize the dynamic range of its output.

Weight Resolution

In an exemplary embodiment, weights 431, 434 are represented in lower resolution, taking one of K values. Where in an exemplary embodiment K is eight. With lower resolution weights, weight blocks 430, 433 can be implemented with less hardware and space on an electronic chip.

In case K equals eight, each weight 431, 434 can have one of eight values, and weight blocks 430, 433 would be 3-bit weight blocks. Hence, we use a 3-bit by 12 bit weight multiplier, which is much smaller than a 12 bit by 12 bit multiplier unit if the weights were represented by 12 bit values. Thus, this design decreases circuit complexity and minimizes any decrease in performance of multiple antenna receiver 200 by using 3-bit by 12 bit multipliers.

In an exemplary embodiment, weights 431, 434 have full resolution. In one exemplary embodiment, full resolution is 8 bits. In order to reduce the complexity of the multiplier, only the most 12 significant bits of the multiplier output are used.

In another exemplary embodiment, the resolution of the combining weights 431,434, is less than or equal to half of the resolution of the data. Hence, significantly reducing the multiplier complexity.

In another exemplary embodiment, weights 431, 434 have a resolution of one bit. In this embodiment the weight magnitudes could be either 1 or 0. This would provide the lowest weighted combining complexity. If the channel magnitude is greater than a threshold, the weight magnitude is chosen to be one, otherwise the weight magnitude is chosen to be zero.

In addition, combiner 224 performs multiplications in sequence as FFTs 220, 222 generate outputs. By multiplying in a sequential manner the outputs of M FFTs 220, 222, combiner 224 only needs M multipliers and only one summer 436, as shown in FIG. 4A. Thus, a combiner that had only two FFTs would only need two multipliers and one summer. Therefore, the design decreases circuit complexity and minimizes any decrease in performance of multiple antenna receiver 200.

Combined with a Transmitter

In an exemplary embodiment, a multiple antenna receiver combiner 200 may be packaged in a single electronic chip with a multiple antenna transmitter combiner to form a multiple antenna receiver/transmitter combiner. An exemplary multiple antenna transmitter combiner is described in copending and commonly owned U.S. patent application Ser. No. 10/682,381 filed Oct. 8, 2003 entitled "Apparatus And Method Of Multiple Antenna Transmitter Beamforming Of High Data Rate Wideband Packetized Wireless Communication Signals". The channel estimation unit and the weight unit above are used to provide the multiple antenna transmitter with the channel estimates and transmitting weights, which are the same as the receiver combining weights, except for the normalization factors.

Multiple Antenna Switching and Combining

An exemplary embodiment of the present invention includes the system and method of multiple antenna receiver combined with multiple antenna switching. Both slow antenna switching and fast antenna switching techniques can be used.

The slow antenna switching is used during the transmission of packets. The slow antenna switching method of Copending U.S. patent application Ser. No. 09/832,029 entitled "Method And System For Providing Antenna Diversity," and filed on Apr. 9, 2001, can be used in conjunction with the present invention. Packets are being transmitted from a default antenna, and the acknowledgment is received by the multiple antenna receiver. If no acknowledgments are received for K transmissions, the transmit antenna is switched to another transmit antenna, where K is an integer value. An exemplary value for K is 2.

The fast antenna switching is used during packet reception. The fast antenna switching method of Co-pending U.S. patent application Ser. No. 09/832,029 entitled "Method And System For Providing Antenna Diversity," filed on Apr. 9, 2001, can be used in conjunction with the present invention. During the premable period each receiver chain can choose from one of many fast switching antennas. The antenna with the largest received power is chosen during the first Short preamble period. Once each receiver chain has switched to the best received antennas, the received packets are processed similar to the multiple antenna receiver described above.

The aforementioned applications are hereby incorporated by reference.

CONCLUSION

The present invention relates to wireless communications. More particularly, the invention relates to a system and method of multiple antenna receiver combining of high data rate wideband packetized wireless communication signals.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

The invention claimed is:

1. An apparatus for combining of M high data rate wideband packetized OFDM wireless communication signals ("M signals") to form a combined output signal, wherein at least M receive antennas each receive one of the M signals, wherein each of the M signals includes N frequency bins, and wherein M is an integer greater than or equal to 2 and N is a positive integer, the apparatus comprising:

a joint timing recovery unit that performs joint coarse signal timing estimation and joint frequency offset estimation on digital data corresponding to each of the M signals;

M Fast Fourier Transform (FFT) units that each convert the digital data for one of the M signals into frequency domain information in the form of sub-carrier data for each of N frequency bins for that one M signal and that output the frequency domain information for each of the M signals; and a combiner that weights and combines the frequency domain information of the M FFT units to thereby generate the combined output signal having reduced circuit impairments and channel effects, wherein the joint timing recovery unit that performs joint timing estimation determines a coarse end time for P consecutive Shorts within the M signals, wherein the joint timing recovery unit determines the coarse end time using self correlation of some of the P Shorts within the M signals, wherein the joint timing recovery unit includes a joint coarse signal time estimation unit that performs the joint coarse signal timing estimation on each of the M signals, the joint coarse signal time estimation unit comprising:

M self-correlation units, wherein each self-correlation unit independently self-correlates the some of the P Shorts in one of the M signals after the automatic gain control unit indicates the start of the M signals and outputs for the one M signal a self correlation signal that is the self-correlation of the P Shorts, wherein P is a positive integer;

M weighting units that weight the self correlation outputs based on the signal strength;

a summer that sums the M weighted self correlation signals to obtain a weighted summed self correlation signal;

a normalizing unit that normalizes the weighted summed self correlation signal, thereby outputting a normalized self correlation signal; and a coarse timing estimation unit that receives the normalized self correlation signal and obtains, for the M signals, the end time for the P Shorts in the M signals by comparing the normalized self correlation signal power to a threshold.

2. The apparatus according to claim 1 further including:

M radio frequency front ends, each having an input coupled to one of the M antennas and outputting analog data corresponding to each of the M signals;

M baseband units, each baseband unit having an input coupled to an output of one of the M radio frequency front ends that inputs the analog data, and having an output that outputs the digital data corresponding to each of the M signals; and wherein the joint timing recovery unit has a plurality of inputs, each input coupled to the output of one of the M baseband units to receive the digital data corresponding to one of the M signals.

3. The apparatus according to claim 2 wherein the FFT units convert the digital data into the frequency domain.

4. The apparatus according to claim 2 further including an automatic gain control unit, and wherein the automatic gain control unit sends a signal to the joint timing recovery unit indicating a start of the M signals.

5. The apparatus of claim 1 wherein P equals 10.

6. The apparatus according to claim 1 wherein the joint timing recovery unit determines the coarse end time using cross correlation of some of the P Shorts within each of the N signals with a known Short sequence, followed by self correlation of the corresponding cross correlation outputs.

7. The apparatus of claim 6 wherein P equals 10.

8. The apparatus according to claim 1 wherein the joint timing recovery unit also performs joint fine timing estimation.

9. The apparatus according to claim 8 wherein the joint fine timing estimation is performed by a joint fine timing estimation unit that operates upon a Long training sequence that follows the P Shorts for each of the M signals.

10. The apparatus according to claim 9 wherein the joint fine timing estimation unit estimates a linear phase ramp to determine a fine timing offset for each of the M signals.

11. The apparatus according to claim 1 wherein each of the M FFTs outputs the frequency domain information sequentially.

12. The apparatus according to claim 11 wherein the frequency domain information comprises an amplitude and a phase.

13. The apparatus according to claim 1 wherein the signals are packetized 802.11g signals.

14. The apparatus according to claim 1 wherein the packetized OFDM signals are 802.11a signals.

15. The apparatus according to claim 1 wherein the weights used by the combiner are obtained from channel estimates.

16. The apparatus according to claim 15 wherein the weights are updated using decision feedback data.

17. The apparatus according to claim 16 wherein the decision feedback data is obtained from hard decision decoded data symbols.

18. The apparatus according to claim 16 wherein the decision feedback data is obtained from a Viterbi decoder output.

19. The apparatus according to claim 1, further including a transmit beamforming unit.

20. The apparatus according to claim 1, further including a fast antenna switching unit that provides for switching of each of the M FFT units to one of the at least M antennas.

21. The apparatus according to claim 20 wherein the one antenna selected by the fast antenna switching unit is selected based upon largest received power obtained during a first Short preamble period of that one antenna as compared to the other antennas.

22. An apparatus for combining of M high data rate wideband packetized OFDM wireless communication signals ("M signals") to form a combined output signal, wherein at least M receive antennas each receive one of the M signals, wherein each of the M signals includes N frequency bins, and wherein M is an integer greater than or equal to 2 and N is a positive integer, the apparatus comprising:
a joint timing recovery unit that performs joint coarse signal timing estimation and joint frequency offset estimation on digital data corresponding to each of the M signals;
M Fast Fourier Transform (FFT) units that each convert the digital data for one of the M signals into frequency domain information in the form of sub-carrier data for each of N frequency bins for that one M signal and that output the frequency domain information for each of the M signals; and
a combiner that weights and combines the frequency domain information of the M FFT units to thereby generate the combined output signal having reduced circuit impairments and channel effects,
wherein the joint timing recovery unit that performs joint timing estimation determines a coarse end time for P consecutive Shorts within the M signals,
wherein the joint timing recovery unit determines the coarse end time using cross correlation of some of the P Shorts within each of the M signals with a known Short sequence, followed by self correlation of the corresponding cross correlation outputs,
wherein the joint timing recovery unit includes a joint coarse signal time estimation unit that performs the joint coarse signal timing estimation on each of the M signals, the joint coarse signal time estimation unit further comprises:
M cross-correlation units, wherein each cross-correlation unit independently cross-correlates some of the P Shorts in one of the M signals with a known Short sequence, after the automatic gain control unit indicates the start of the M signals and outputs for each of the M signals a cross-correlation signal;
M self-correlation units, wherein each self-correlation unit is logically coupled to a separate one of the M cross-correlation units and wherein each self-correlation unit independently self-correlates the output of the corresponding cross-correlation unit;
M weighting units that weight the self correlation outputs based on the signal strength;
a summer that sums the M weighted self correlation signals to obtain a weighted summed self correlation signal;
a normalizing unit that normalizes the weighted summed self correlation signal, thereby outputting a normalized self correlation signal; and
a coarse timing estimation unit that receives the normalized self correlation signal and obtains, for the M signals, the end time for the P Shorts in the M signals by comparing the normalized self correlation signal power to a threshold.

23. The apparatus of claim 22 wherein P equals 10.

24. An apparatus for combining of M high data rate wideband packetized OFDM wireless communication signals ("M signals") to form a combined output signal, wherein at least M receive antennas each receive one of the M signals, wherein each of the M signals includes N frequency bins, and wherein M is an integer greater than or equal to 2 and N is a positive integer, the apparatus comprising:
a joint timing recovery unit that performs joint coarse signal timing estimation and joint frequency offset estimation on digital data corresponding to each of the M signals;
M Fast Fourier Transform (FFT) units that each convert the digital data for one of the M signals into frequency domain information in the form of sub-carrier data for each of N frequency bins for that one M signal and that output the frequency domain information for each of the M signals; and
a combiner that weights and combines the frequency domain information of the M FFT units to thereby generate the combined output signal having reduced circuit impairments and channel effects,
wherein the joint timing recovery unit determines a weighted frequency offset for the M signals,
wherein the joint timing recovery unit comprises a joint frequency offset estimation unit that performs the joint frequency offset estimation on the M signals, the joint frequency offset estimation unit comprising:
M self-correlation units, wherein each self-correlation unit independently self-correlates some of the P Shorts in each of the M signals and outputs a self-correlation signal that is the self-correlation output of the some of the P Shorts, wherein P is a positive integer;
M weighting units that weight the self correlation outputs based on the signal strength;
a summer that sums the M weighted self-correlation signals, thereby obtaining a summed self-correlation signal;
a normalizing unit that normalizes the weighted summed self correlation signal, thereby outputting a normalized self correlation signal;
an angle calculator that extracts an angle from the normalized self-correlation signal; and
a coarse frequency offset estimation unit that obtains the frequency offset using the angle.

25. The apparatus of claim 24 wherein P equals 10.

26. An apparatus for combining of M high data rate wideband packetized OFDM wireless communication signals ("M signals") to form a combined output signal, wherein at least M receive antennas each receive one of the M signals, wherein each of the M signals includes N frequency bins, and wherein M is an integer greater than or equal to 2 and N is a positive integer, the apparatus comprising:

a joint timing recovery unit that performs joint coarse signal timing estimation and joint frequency offset estimation on digital data corresponding to each of the M signals;

M Fast Fourier Transform (FFT) units that each convert the digital data for one of the M signals into frequency domain information in the form of sub-carrier data for each of N frequency bins for that one M signal and that output the frequency domain information for each of the M signals; and a combiner that weights and combines the frequency domain information of the M FFT units to thereby generate the combined output signal having reduced circuit impairments and channel effects, wherein the joint timing recovery unit determines a weighted frequency offset for the M signals, wherein the joint timing recovery unit comprises a joint frequency offset estimation unit that performs the joint frequency offset estimation on each of the M signals, the joint frequency offset estimation unit comprising:

M cross-correlation units, wherein each cross-correlation unit independently cross-correlates some of the P Shorts in one of the M signals with a known Short sequence, after the automatic gain control unit indicates the start of the one M signal and outputs for the one M signal a cross-correlation signal;

M self-correlation units, wherein each self-correlation unit is logically coupled to a separate one of the M cross-correlation units and wherein each self-correlation unit independently self-correlates the output of the corresponding cross-correlation output;

M weighting units that weight the self correlation outputs based on the signal strength;

a summer that sums the M weighted self-correlation signals, thereby obtaining a weighted summed self-correlation signal;

a normalizing unit that normalizes the weighted summed self correlation signal, thereby outputting a normalized self correlation signal;

an angle calculator that extracts an angle from the normalized self-correlation signal; and a coarse frequency offset estimation unit that obtains the frequency offset using the angle.

27. An apparatus for combining of M high data rate wideband packetized OFDM wireless communication signals ("M signals") to form a combined output signal, wherein at least M receive antennas each receive one of the M signals, wherein each of the M signals includes N frequency bins, and wherein M is an integer greater than or equal to 2 and N is a positive integer, the apparatus comprising:

a joint timing recovery unit that performs joint coarse signal timing estimation and joint frequency offset estimation on digital data corresponding to each of the M signals;

M Fast Fourier Transform (FFT) units that each convert the digital data for one of the M signals into frequency domain information in the form of sub-carrier data for each of N frequency bins for that one M signal and that output the frequency domain information for each of the M signals; and a combiner that weights and combines the frequency domain information of the M FFT units to thereby generate the combined output signal having reduced circuit impairments and channel effects, wherein the joint timing recovery unit determines a weighted frequency offset for the M signals, wherein the joint timing recovery unit comprises a joint frequency offset estimation unit that performs the joint frequency offset estimation on the M signals, the joint frequency offset estimation unit comprising:

M self-correlation units, wherein each self-correlation unit independently self-correlates some of the P Shorts in each of the M signals and outputs a self-correlation signal that is the self-correlation output of the some of the P Shorts, wherein P is a positive integer;

M weighting units that weight the self correlation outputs based on the signal strength;

a summer that sums the M weighted self-correlation signals, thereby obtaining a summed self-correlation signal;

an angle calculator that extracts an angle from the weighted summed self correlation signal; and a coarse frequency offset estimation unit that obtains the frequency offset using the angle.

28. An apparatus for combining of M high data rate wideband packetized OFDM wireless communication signals ("M signals") to form a combined output signal, wherein at least M receive antennas each receive one of the M signals, wherein each of the M signals includes N frequency bins, and wherein M is an integer greater than or equal to 2 and N is a positive integer, the apparatus comprising:

a joint timing recovery unit that performs joint coarse signal timing estimation and joint frequency offset estimation on digital data corresponding to each of the M signals;

M Fast Fourier Transform (FFT) units that each convert the digital data for one of the M signals into frequency domain information in the form of sub-carrier data for each of N frequency bins for that one M signal and that output the frequency domain information for each of the M signals; and a combiner that weights and combines the frequency domain information of the M FFT units to thereby generate the combined output signal having reduced circuit impairments and channel effects, wherein the joint timing recovery unit determines a weighted frequency offset for the M signals, wherein the joint timing recovery unit comprises a joint frequency offset estimation unit that performs the joint frequency offset estimation on each of the M signals, the joint frequency offset estimation unit comprising:

M cross-correlation units, wherein each cross-correlation unit independently cross-correlates some of the P Shorts in one of the M signals with a known Short sequence, after the automatic gain control unit indicates the start of the one M signal and outputs for the one M signal a cross-correlation signal;

M self-correlation units, wherein each self-correlation unit is logically coupled to a separate one of the M cross-correlation units and wherein each self-correlation unit independently self-correlates the output of the corresponding cross-correlation output;

M weighting units that weight the self correlation outputs based on the signal strength;

a summer that sums the M weighted self-correlation signals, thereby obtaining a weighted summed self-correlation signal;

an angle calculator that extracts an angle from the weighted summed self correlation signal; and a coarse frequency offset estimation unit that obtains the frequency offset using the angle.

29. An apparatus for combining of M high data rate wideband packetized OFDM wireless communication signals ("M signals") to form a combined output signal, wherein at least M receive antennas each receive one of the M signals, wherein each of the M signals includes N frequency bins, and wherein M is an integer greater than or equal to 2 and N is a positive integer, the apparatus comprising:

a joint timing recovery unit that performs joint coarse signal timing estimation and joint frequency offset estimation on digital data corresponding to each of the M signals;

M Fast Fourier Transform (FFT) units that each convert the digital data for one of the M signals into frequency domain information in the form of sub-carrier data for each of N frequency bins for that one M signal and that output the frequency domain information for each of the M signals; and a combiner that weights and combines the frequency domain information of the M FFT units to thereby generate the combined output signal having reduced circuit impairments and channel effects, wherein the joint timing recovery unit determines a weighted frequency offset for the M signals, wherein the combiner comprises:

a channel estimation unit (CEU) that, for each of the N frequency bins in each of the M signals, receives the outputs of the M FFFs and outputs a channel estimate;

a weight calculator that, for each of the N frequency bins in each of the M signals, receives a corresponding one of the channel estimates from the CEU, receives M RF gains, provides feedback to the CEU, and outputs a weight;

M weight blocks that, for each of the N frequency bins in each of the M signals, receive the weights from the weight calculator, receive sub-carrier data for each of the N frequency bins for each of the M signals, and multiply the sub-carrier data for each of the N frequency bins for each of the M signals with a corresponding weight to obtain weighted sub-carrier data for each of the N frequency bins for each of the M signals;

a summer that sums the weighted sub-carrier data by frequency bin to obtain M weighted sub-carrier data sums;

a pilot tracking unit that, for each of the N frequency bins, receives pilot data from a corresponding pilot frequency bin also output from the summer and outputs pilot tracking information for each of the N frequency bins; and a channel correction unit that, for each of the N frequency bins, converts the weights from the weight calculator, the corresponding weighted sub-carrier data stun output from the summer, and the pilot tracking information from the pilot tracking unit into the combined output signal.

30. The apparatus according to claim 29 wherein the weights obtained by the weight calculator are updated using decision feedback data.

31. The apparatus according to claim 30 wherein the decision feedback data is obtained from hard decision decoded data symbols.

32. The apparatus according to claim 30 wherein the decision feedback data is obtained from a Viterbi decoder output.

33. The apparatus according to claim 29 wherein each of the M weights is a discretized weight.

34. The apparatus according to claim 33 wherein the discretized weight is represented by a 3-bit binary number.

35. The apparatus according to claim 29 wherein the frequency domain signal is represented by a 12-bit binary number.

36. The apparatus according to claim 29 wherein each of the M weight blocks is a 12-bit×3-bit multiplier.

* * * * *